(12) United States Patent
Amatucci et al.

(10) Patent No.: US 9,331,357 B2
(45) Date of Patent: May 3, 2016

(54) ELECTROCHEMICALLY SELF ASSEMBLED BATTERIES

(75) Inventors: Glenn G. Amatucci, Peapack, NJ (US); Irene Plitz, North Plainfield, NJ (US); Fadwa Badway, Old Bridge, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 1623 days.

(21) Appl. No.: 11/813,309

(22) PCT Filed: Jan. 6, 2006

(86) PCT No.: PCT/US2006/000448
§ 371 (c)(1),
(2), (4) Date: Jun. 19, 2008

(87) PCT Pub. No.: WO2006/078472
PCT Pub. Date: Jul. 27, 2006

(65) Prior Publication Data
US 2009/0004560 A1    Jan. 1, 2009

Related U.S. Application Data

(60) Provisional application No. 60/641,449, filed on Jan. 6, 2005, provisional application No. 60/727,471, filed on Oct. 17, 2005.

(51) Int. Cl.
*H01M 6/22* (2006.01)
*H01M 6/18* (2006.01)
*H01M 10/0565* (2010.01)
(Continued)

(52) U.S. Cl.
CPC ........... *H01M 10/0422* (2013.01); *H01B 1/122* (2013.01); *H01M 6/18* (2013.01); *H01M 6/22* (2013.01); *H01M 10/0565* (2013.01); *H01M 2/022* (2013.01); *H01M 4/582* (2013.01); *H01M 10/0472* (2013.01); *H01M 2300/002* (2013.01); *H01M 2300/0082* (2013.01); *H01M 2300/0085* (2013.01); *H01M 2300/0091* (2013.01)

(58) Field of Classification Search
None
See application file for complete search history.

(56) References Cited

U.S. PATENT DOCUMENTS 4,007,122 A * 2/1977 Owens et al. ................. 252/62.2
4,544,615 A * 10/1985 Shishikura et al. ........... 429/339
(Continued)

FOREIGN PATENT DOCUMENTS

DE    3930804 A1    3/1991
EP    0149421    *    7/1985    ............. H01M 4/60
(Continued)

OTHER PUBLICATIONS

International Search Report for International Application No. PCT/US06/00448.
(Continued)

*Primary Examiner* — Barbara Gilliam
*Assistant Examiner* — Angela Martin
(74) *Attorney, Agent, or Firm* — Greenberg Traurig, LLP

(57) ABSTRACT

The present invention relates to in situ formation of a single-layered electrochemical cell comprising a full tri-layer battery structure containing a discrete positive electrode, solid state electrolyte, and negative electrode from self-assembled nanocomposites. The single layered cell makes it possible to fabricate cells in three dimensions resulting in a very high energy density power source within very small and/or complex dimensions.

27 Claims, 12 Drawing Sheets

(51) Int. Cl.
  *H01M 10/04* (2006.01)
  *H01B 1/12* (2006.01)
  *H01M 2/02* (2006.01)
  *H01M 4/58* (2010.01)

(56) References Cited

U.S. PATENT DOCUMENTS

| | | | |
|---|---|---|---|
| 4,560,633 A * | 12/1985 | Kobayashi et al. | 429/213 |
| 5,360,686 A | 11/1994 | Peled et al. | |
| 5,792,574 A | 8/1998 | Mitate et al. | |
| 6,168,884 B1 | 1/2001 | Neudecker et al. | |
| 6,517,974 B1 | 2/2003 | Kobayashi et al. | |
| 2005/0003270 A1 * | 1/2005 | Phillips | 429/223 |
| 2010/0323098 A1 * | 12/2010 | Kosuzu et al. | 427/77 |

FOREIGN PATENT DOCUMENTS

| | | |
|---|---|---|
| EP | 0149421 A2 | 7/1985 |
| JP | 08138635 A | 5/1996 |

OTHER PUBLICATIONS

European Search Report dated Aug. 27, 2009.

* cited by examiner

Metal Substrate → Etched or Ion Milled Metal Substrate

Infiltrated via Direct Write Substrate → In-situ Formed Electrochemical Cell – 7 Cells Figure 9 refers to figure 8, it is just the second discharge result Degrees Two-Theta

ELECTROCHEMICALLY SELF ASSEMBLED BATTERIES

CROSS-REFERENCE TO RELATED APPLICATIONS

This application claims priority to U.S. provisional application No. 60/641,449, filed Jan. 6, 2005, and 60/727,471, filed Oct. 17, 2005. The contents of each of these applications are incorporated by reference herein in their entirety.

GOVERNMENT SUPPORT

This work is supported at least in part by grants to Dr. Amatucci. The government may have certain rights in this invention.

FIELD OF THE INVENTION

The present invention relates to a new concept in the development of an electrochemically self assembled battery. Particularly, the self assembled chemistry relates to an ideal way to fabricate microbatteries. More particularly, this chemistry can be applied to the development of a micro battery rod, which allows unprecedented application as a power platform for micro sensors and as power and structural members for micromachines.

BACKGROUND OF THE INVENTION

The size of microelectronic and microelectromechanical systems continues to decrease as a result of improved integration and microprocessing techniques. However, the macroscopic power systems currently employed to power these microdevices are much larger than the devices themselves and require complex circuitry. Although the search for micropower sources has recently raised an increasing amount of interest, the demand for suitable small-scale power system that meet microsystem power and energy requirements has yet to be fulfilled. In most applications, power supply miniaturization advanced to the microdevice scale would provide more control over the power delivery to each component of the microsystem and would also simplify electronic circuitry. The incorporation of a micropower source directly into microsystems that also integrate communication and signal-processing components would offer the advantage of complete autonomy, a critical feature in many applications such as microsensors. (J. Long, B. Dunn, D. Holism and H. White, Chem. Rev. 104: 4463 (2004)). One crucial issue related to micro-power sources is to provide enough energy and power to all the components for the remote microsystem to function while minimizing the size of the power system. As constituent materials and fabrication techniques often restrict battery thickness, system optimization usually consists in minimizing footprint occupancy while meeting the energy and power requirements. This challenge opens opportunities for the development of fabrication technologies for materials in the micro and nano scale.

Existing Energy Storage Solutions
  a. Thick Film Polymer Batteries

High-energy density primary and secondary batteries of relatively thin dimensions are currently commercially available. (J. L. Souquet and M. Duclot, Solid State Ionics, 148: 375 (2002)). These thick-film batteries are constructed with polymer electrolyte films laminated to the positive and negative electrodes and packaged with polylaminate aluminum/polyethylene heats sealable packaging material. Major polymeric electrolytes (W. H. Meyer, Adv. Mater., 10: 439 (1998), J. Y. Song, Y. Y. Wang and C. C. Wan, J. Power Sources, 77: 183 (1999)) include gel electrolytes formed by polymers swollen by lithium salt solutions and solid polymer electrolytes (SPEs) (I. C. Murata, S. Isuchi and Y. Yoshihisa, Electrochem. Acta 45: 1501 (2000)). The overall thickness of this type of flat batteries, including packaging, lies in the 0.3-3 mm range. The size, packaging and electrochemical performance of such cells make then unsuitable for direct application to small electronic circuitry as would be commonplace in sensors and MEMS.

b. Thin Film Batteries

An alternative to further decrease the overall thickness of flat batteries by an order of magnitude to approximately 10 μm lay in the use of microelectronic fabrication techniques, such as sputtering and vacuum evaporation, to fabricate all solid state thin film batteries. This battery technology is based on thin glassy oxide and sulfide electrolytes. These liquid-free electrolytes suppressed the risk of liquid leakage, a critical issue due to the proximity of the power source to the electronic components. Their low ionic conductivity is counter-balanced by low diffusion lengths as a result of reduced film thickness allowed by the microelectronic fabrication techniques. Furthermore, these fabrication techniques allow the deposition of the battery components directly on the microsystem substrate to achieve small footprint and substrate localization to the operating device.

Eveready Battery Company (S. D. Jones and J. R. Akridge Solid State Ionics, 86-88: 1291 (1996)) and Hydromecanique Et Frottements (HEF), in collaboration with the University of Bordeaux (J. P. Terra, M. Martin, A. Levasseur, G. Meunier and P. Vinatier, Tech. Mg., Genie Blear. D., 3342: 1 (1998)), have manufactured rechargeable all state thin film lithium batteries less than 10 μm thick. While the latter based its battery technology on amorphous titanic or molybdenum oxysulfide cathodes, the former utilized $TiS_2$ cathodes. In both cases, the lithium anodes were obtained by vacuum evaporation while the cathodes and electrolytes were deposited by sputtering. The use of a hydrophobic polymer protective packaging increased the overall thickness of the batteries to about 100 μm.

The most successful thin film battery technology has been demonstrated by Oak Ridge National Laboratory (J. B. Bates, N. J. Dudney, B. Neudecker, A. Ueda and C. D. Evans, Solid State Ionics 135: 33 (2000)). This group has developed rechargeable lithium batteries using RF magnetron sputtering (lithium transition metal oxide cathode and UPON electrolyte) and thermal evaporation (Li anode). These batteries, sealed with a protective hermetic multilayer coating of parylene and titanium, presented the advantage of retaining an overall thickness of less than 15 μm. This battery design was further improved to be compatible with the integrated circuit (IC) assembly solder reflow process performed at 250-260° C. The low melting lithium metal anode (180° C.) was replaced by high melting inorganic anodes in Li-ion batteries and by in-situ lithium platted copper anodes in initially lithium-free batteries.

Although these very thin batteries offer long cycle and shelf life, they are unable to satisfy the area energy requirements for microsystem applications. Sputtering techniques prevent the addition of carbon to enhance the electronic conductivity of the semi-conducting cathode, limiting its thickness and therefore its capacity per area. Sequential sputtering of complete electrochemical cells to build on thickness does not afford a solution, as multiple current collectors must be utilized thereby limiting columetric energy density. In addition, sputtering and vacuum evaporation fabrication methods are costly and time consuming due to low film deposition rates in the order of nm to μm/h. Therefore there is a critical need to establish technology with the small footprint of thin film batteries but with thicker electrodes in the range of 25-100 microns to deliver the required energy.

Three Dimensional Batteries

As discussed, existing thick film technology and thin film battery technology offer poor solutions to the majority of micropower applications. Having identified this problem, a number of researchers have instituted studies related to the development of three dimensional battery microstructures. The advantage of such microstructures is that they consume small amount of surface area on the electronic component and allow the development of energy by building the energy storage device in the z or third direction perpendicular from the substrate. However, due to the intrinsic complexity of the lithium battery technology, it is very difficult to assemble such batteries in a reliable manner that enables such structures to be incorporated. To date, no one has identified a means to do so and demonstrated a working cell. The lithium battery technology consists of a negative electrode (Li metal), an electrolyte/separator (solid state lithium ion conductor) and positive electrode material. Successively deposited or self assembled architectures are very difficult to achieve in 3 dimensions and have poor prospects for robustness once assembled. The latter point is due to the tendency to form electronic shorts through the electrolyte/separator.

The common theme of all the above techniques is the use of traditional lithium-ion or lithium metal related battery configurations to address a very complex and unique problem. It is readily apparent that a new approach is needed, and that is the subject of this invention.

SUMMARY OF THE INVENTION

The present invention provides a single-layered electrochemical cell comprising a full tri-layer battery structure containing a discrete positive electrode, solid state electrolyte, and negative electrode formed in situ from self-assembled composites or nanocomposites. According to one embodiment of the present invention, an ionically conducting composition comprises a metal halide composite to which an electrical potential is applied to form a negative electrode comprising a reduced form of a metal cation and a positive electrode comprising an oxidized halide anion, wherein the negative electrode and positive electrode are formed in situ. According to another embodiment, the metal halide composite of the composition comprises a compound selected from the group consisting of an alkali metal halide, an alkaline earth metal halide, and a rare earth metal halide. According to another embodiment, the alkali metal halide composite of the composition comprises an alkali metal selected from the group consisting of lithium, sodium, potassium, rubidium, and cesium. According to another embodiment, the alkali metal halide composite of the composition comprises lithium iodide. According to another embodiment, the alkaline earth metal halide composite of the composition comprises an alkaline earth metal selected from the group consisting of magnesium, calcium, strontium, and barium. According to another embodiment, the rare earth metal halide composite of the composition comprises a rare earth metal selected from the group consisting of yttrium and lanthanum. According to another embodiment, the metal halide composite of the composition comprises a halide selected from the group consisting of fluorine, bromine, iodine and chlorine. According to another embodiment, the metal halide composite of the composition comprises a fluoride ion. According to another embodiment, the metal halide composite of the composition comprises an iodide ion.

According to another embodiment, a compound comprising an oxidized iodate ion forms at the positive electrode upon application of a charging potential to the metal halide composite of the composition. According to another embodiment, an oxidized compound comprising a polyiodide ion forms at the positive electrode upon application of a charging potential to the metal halide composite of the composition. According to another embodiment, an oxidized compound comprising a metal iodide forms at the positive electrode upon application of a charging potential to the metal halide composite of the composition. According to another embodiment, the metal halide composite of the composition is a nanocomposite.

According to another embodiment, the metal halide composite of the composition further comprises an organic component. According to another embodiment, the organic component is an organic material that forms compounds with iodine. According to another embodiment, the organic material that forms compounds with iodine is poly(vinylpyrrolidone). According to another embodiment, the organic component is a conductive compound. According to another embodiment, the conductive compound is a compound selected from the group consisting of poly(2 vinylpyridine), polyethylene oxide, polyvinyldene fluoride, polythiophene, polyfluorothiophene, polypyrrole, polyaniline, and their respective monomers.

According to another embodiment, the composition further comprises a nanostructured inorganic component. According to another embodiment, the nanostructured inorganic component is at least one compound selected from the group consisting of silicon oxide, aluminum oxide, barium titanate, and silicon nitride. According to another embodiment, the metal halide composite of the composition further comprises at least one subgroup selected from the group consisting of water and hydroxyl ions.

According to another embodiment, the negative electrode further comprises a metal current collector. According to another embodiment, the metal current collector of the negative electrode is formed of a metal selected from the group consisting of stainless steel, silicon, nickel, aluminum, tin, gold, silver, platinum, and copper. According to another embodiment, the oxidized halide ion forms a complex with the metal current collector of the positive electrode. According to another embodiment, the positive electrode comprises a metal current collector. According to another embodiment, the metal current collector of the positive electrode is formed of a metal selected from the group consisting of stainless steel, copper, nickel, aluminum, gold, silver, and platinum.

According to another embodiment, the composition is deposited in a thickness of less than about 100 microns. According to another embodiment, the composition is deposited by a direct write technology.

According to yet another embodiment, an electrochemical cell of the present invention comprises a tube having dimensions of length, width and depth, wherein in cross-section, the tube has a shape selected from the group consisting of a circle, an oblong, a square and a rectangle, wherein the axial ratio is >1, and wherein the thickness of the tube in 2 of the 3 dimensions is less than 1 mm. According to another embodiment, the electrochemical cell further comprises a conducting wire located approximately centered in the cross section of the tube, wherein the conducting wire continues down the length of the cell. According to another embodiment, the electrochemical cell is a cylinder less than about 1 mm in diameter. According to another embodiment, the outside surface of the tube is an outside current collector and the conducting wire is an inside current collector. According to another embodiment, the outside current collector is a positive electrode and the inside current collector is a negative electrode. According to another embodiment, the positive electrode is made of at least one material selected from the group consisting of stainless steel, silicon, tungsten, chromium, and aluminum. According to another embodiment, the negative electrode is made of at least one material selected from the group consisting of stainless steel, silicon, tungsten, magnesium, chromium, and aluminum.

According to another embodiment, the electrochemical cell is formed in situ by a composite comprising a compound, wherein the composite is placed between two electrodes and the cell forms by application of an electrical potential to the composite. According to another embodiment, the composite further comprises at least one subgroup selected from the group consisting of water and hydroxyl ions. According to another embodiment, a compound comprising an oxidized iodine ion forms at the positive electrode of the cell upon application of a charging potential. According to another embodiment, an oxidized compound comprising at least one ion selected from the group consisting of an iodide ion and a polyiodide ion forms at the positive electrode of the cell upon application of a charging potential. According to another embodiment, an oxidized compound comprising a metal iodide forms at the positive electrode of the cell upon application of a charging potential.

According to another embodiment, the compound comprises a metal halide. According to another embodiment, the metal halide is selected from the group consisting of an alkali metal halide, an alkaline earth metal halide, and a rare earth metal halide. According to another embodiment, the alkali metal halide comprises an alkali metal selected from the group consisting of lithium, sodium, potassium, rubidium, and cesium. According to another embodiment, the alkali metal halide comprises lithium. According to another embodiment, the alkali metal halide is lithium iodide. According to another embodiment, the alkaline earth metal halide comprises an alkaline earth metal selected from the group consisting of magnesium, calcium, strontium, and barium. According to another embodiment, the rare earth metal halide comprises a rare earth metal selected from the group consisting of yttrium and lanthanum. According to another embodiment, the metal halide compound comprises a halide selected from the group consisting of fluorine, bromine, iodine and chlorine.

According to another embodiment, the composite of the electrochemical cell further comprises an organic component. According to another embodiment, the organic component is an organic material that forms compounds with iodine. According to another embodiment, the organic material that forms compounds with iodine is poly(vinylpyrrolidone). According to another embodiment, the organic component is a conductive compound. According to another embodiment, wherein the conductive compound is selected from the group consisting of poly(2 vinylpyridine), polyethylene oxide, polyvinyldene fluoride, polypyrrole, polythiophene, polyfluorothiophene, polyaniline, and their respective monomers. According to another embodiment, the composition further comprises a nanostructured inorganic component. According to another embodiment, the nanostructured inorganic component is at least one compound selected from the group consisting of silicon oxide, aluminum oxide, barium titanate, and silicon nitride. According to another embodiment, the composite of the electrochemical cell is a nanocomposite. According to another embodiment, the length dimension of the electrochemical cell is extended to a second longer length dimension, and a group comprising sensing, wireless communications, and energy harvesting electronics is contained within the second longer length dimension of the electrochemical cell.

DETAILED DESCRIPTION OF THE INVENTION

Figure 1:
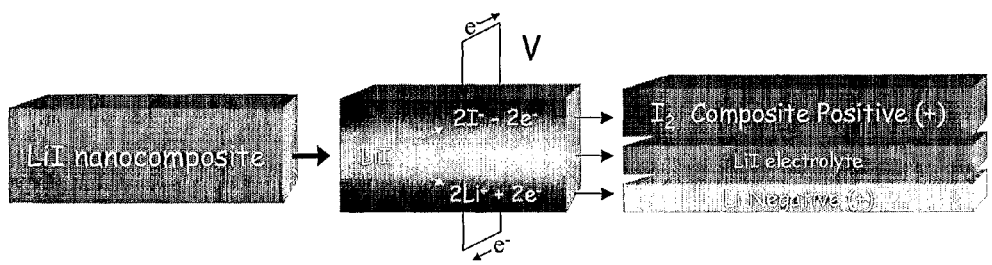
FIG. 1 depicts the in-situ formation of a full tri-layer (positive electrode, electrolyte, negative electrode) battery structure from a single layer according to the present invention.

The present invention enables the fabrication of small and/or complex three dimensional energy storage electrochemical cells. Within the present invention, compounds have been identified, which, when processed in the correct fashion, can be deposited or absorbed into a complex shape as a single layer material. Through the application of a voltage to this single layer material, a full tri-layer battery structure containing a discrete positive electrode, solid state electrolyte, and negative electrode is formed in-situ. This is a challenge and concept that has not been met or addressed to date. The single layered cell enables the unparalleled capability to fabricate cells in three dimensions resulting in a very high energy density power source within very small and/or complex dimensions.

It has previously been shown that nanostructured metal fluorides can be converted to lithium fluoride and metal (See PCT/US2005/35625, entitled "Bismuth Fluoride Based Nanocomposites as Electrode Materials" and U.S. patent application Ser. No. 11/177,729, entitled "Copper Fluoride Based nanocomposites as Electrode Materials; the contents of each of these applications is incorporated by reference herein). This technology has enabled the reversible conversion reaction of these nanostructured metal fluorides for use as very high energy density electrodes for traditional lithium batteries. According to a preferred embodiment of the present invention, that concept has been extended in reverse by starting the single layer battery with a nanostructured lithium halide and then applying charge.

According to the present invention, it is preferred that such a cell is based on lithium metal anodes due to the intrinsic high voltage of lithium metal. Alternatively, certain alkaline earth metals, preferably magnesium or its alloys, may be utilized to enhance volumetric energy. In order to form a lithium metal electrode and a counter electrode that has a large voltage difference according to the present invention, alkali metal halides, alkaline earth metal halides, or rare earth metal halides are used. Of the lithium or alkaline earth halides, the iodides are most preferred, due to their high mobility, but bromides, chlorides, or fluorides may be utilized for the higher voltage they impart to the electrochemical cell.

The very basic lithium (Li) metal vs iodine ($I_2$) cells have been utilized in cardiac pacemakers for many years because of their intrinsically high volumetric energy density which exceeds that of existing lithium ion approaches discussed above by a great factor. Most importantly, lithium iodine chemistry is very difficult to short: when the two electrodes Li and $I_2$ are brought in contact, they form a LiI conversion product, which acts as a solid state electrolyte, thereby granting self healing attributes and incredible robustness to the technology. The cell reaction for the lithium iodine chemistry is:

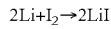

$$2Li + I_2 \rightarrow 2LiI$$

After LiI is formed, the cell is discharged and dead. However, the focus of the present invention is to utilize a composite or nanocomposite form of the inactive discharge product LiI as the starting component and to reverse the reaction, demonstrated by the following simplistic representation:

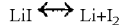

$$LiI \leftrightarrow Li + I_2$$

It will be shown later that although the cell formed in-situ is similar to a simple Li—$I_2$ chemistry, it has a positive electrode which differentiates itself from such chemistries.

According to the present invention, as shown in the simplified schematic of FIG. 1, a highly ionically conductive, electrically insulative nanocomposite based on LiI and a binder is placed between two current collectors. Upon the application of potential, lithium ions ($Li^+$) diffuse towards the negative electrode and the iodide anions ($I^-$) diffuse towards the positive electrode. At the negative electrode, the lithium ions reduce and plate at the negative electrode in the form of lithium metal, thereby forming in-situ the lithium metal negative electrode. At the positive electrode, the $I^-$ oxidizes either to form elemental iodine ($I_2$), polyiodides ($I_n$) form a complex with the metal current collector, such as Ni to form $NiI_2$, or, even more preferably, the $I^-$ reacts with a complexing organic component, such as polyvinylpyrrolidone or conducting conjugated polymers such as poly(2-vinylpyridine), or other conjugated conducting polymers such as those based on thiophenes and anilines, and their respective monomers, which form a conducting composites with iodine. Finally such $I^-$ oxidation in presence of a small amount of oxygen supplied by water or an organic can lead to the formation of high energy iodates $(IO_3)^-$ or periodates $(IO_4)^-$. This in effect forms the positive electrode. Normally, such a reaction would be difficult to control.

In certain embodiments, the ionically conducting composition of the invention further comprises a nanostructured inorganic component. The nanostructured inorganic component is at least one compound selected from the group consisting of silicon oxide, aluminum oxide, barium titanate, and silicon nitride or a mixture thereof.

If the in-situ cell formation reaction is brought to completion, the electronically conducting Li metal negative electrode would eventually contact the iodine containing and conductive positive electrode resulting in an electrically shorted cell. Shorting is a major problem in small cells as the separation distances between the negative and positive electrodes are extremely small and subject to compromise. This failure is further aggravated by repeated volume changes occurring at the positive and negative electrodes during cycling. Non-electrochemical reasons for cell failure due to shorting can be induced by thermal cycling of the cell and mechanical abuse as one would expect in many sensor or drug delivery applications. However, according to the present invention, this is not the case as iodine when contacting Li will reform the LiI electrolyte thermodynamically and stabilize the cell. Likewise, this would be expected to occur for the alternative metal halide combinations of the present invention. As a result of this behavior, it would be very difficult for this cell to internally short, as the passivating, ionically conducting LiI layer always forms.

After polarization and in-situ formation of the cell according to the present invention, a modified version of a high volumetric energy density rechargeable lithium/iodine cell is essentially formed in-situ. The self assembled chemistry of the present invention allows unprecedented ease of fabricating thin cells in all three dimensions, which will enable exceptional utilization of valuable sensor surface area, easy tuning of the cell voltage by changing parallel vs. series configuration, high reliability, low cost, and easy hermetic sealing.

In certain embodiments, the present invention is used to power sensor and sensor arrays in an on-chip configuration where sensor electronics, communications and powering exist on a common platform. For such applications, incorporation of the power source directly on or in the substrate is vital to preserving small format. Such on-chip incorporation will allow production of sensors in larger numbers for smart node array deployment that will be beneficial for applications such as infrastructure monitoring and in-vivo biomedical applications. Because it is desirable to preserve the surface area of the sensor, the fabrication of such power sources is focused in the third dimension or "z" direction.

Figure 2:
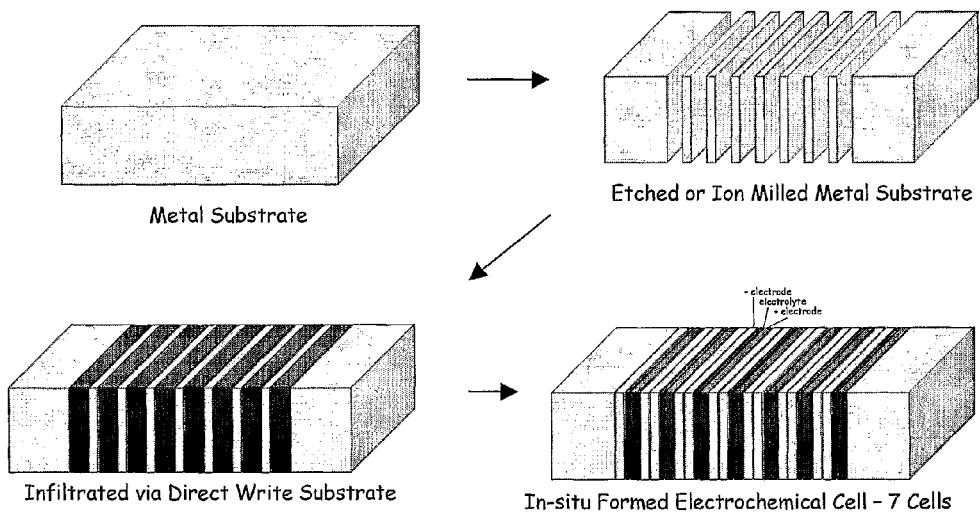
FIG. 2 shows a 3D battery cell fabricated according to the present invention.

In other embodiments, the present invention is used to form three dimensional (3D) batteries. FIG. 2 depicts a 3D cell fabricated according to the present invention where parallel plates of the battery are formed directly in the depth of the sensor substrate. This configuration enables the utilization of the silicon substrate in a multifunctional way. As shown in FIG. 2, the cell is fabricated by etching or ion milling parallel plates of a metal collector into the metal substrate. Parallel plates having a separation distance of approximately 25-50 microns are formed through micro wire EDM or laser micromachining. In other embodiments, the plates are micromilled to enable varying degrees of parallel and series connectivity. Afterwards, the single layer nanocomposite composition of the present invention is deposited by direct write technology between the parallel plates followed by a top layer coating of a hermetic barrier based on inorganic or inorganic/organic hybrids containing an inorganic component including but not limited to aluminum oxides, metals, silicon oxides, titanium oxides, silicon nitrides, and the like. The full cell then is fabricated by electrochemical polarization.

In other embodiments, micromachining capabilities, such as microwire electrodischarge machining (EDM) and laser micromachining can be used to form discrete 3 dimensional micro power cubes ("MPC"s) smaller than 1 mm in dimension. MPCs prepared according to the present invention are incorporated into electronics and handled very much like micro multilayered capacitors in implementation.

Figure 3:
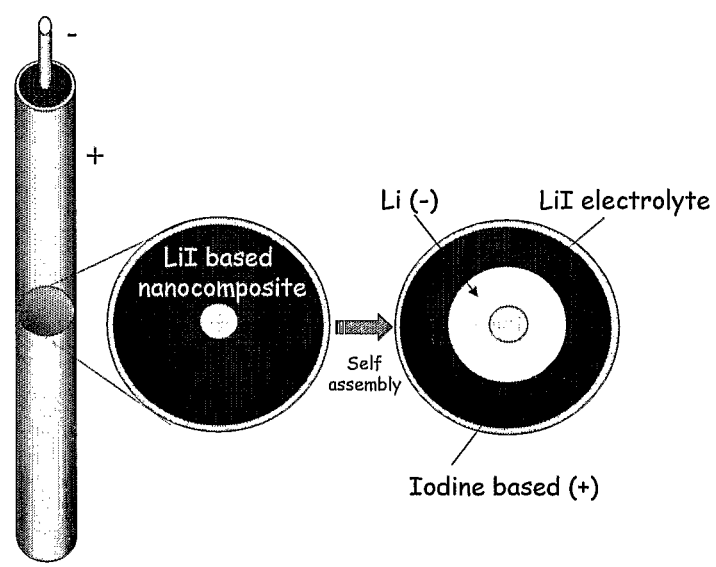
FIG. 3 shows a micropower rod fabricated according to the present invention.

In certain embodiments, the present invention takes the form of a micro power rod ("MPR"). As shown in FIG. 3, a cylindrical sheath is formed of a hermetic conducting metal or Si. The counter current collector wire at the center of the cylinder is formed of at least one metal selected from the group of stainless steel, magnesium, chromium, tungsten and aluminum. It is preferred that the current collector wire is formed of a stiff conducting metal, such as tungsten. The nanocomposite of the present invention is backfilled between the two current collectors and polarized to form the three layers of the battery (anode, electrolyte, and cathode) in-situ. The ends are sealed with a low melting point hermetic inorganic or inorganic/organic hybrid compound. The rod configuration possesses multifold advantages. The metallic sheath of the power rod acts a current collector and an exceptional hermetic barrier. In addition the rod configuration allows the energy storage chemistry of the present invention to be an integral structural member which can be utilized to build the framework of micromachines and of micro air vehicles and, additionally, to give power. It is envisioned that a micro power rod made according to the present invention can act as an antennae for communication applications. It is further envisioned that the structural framework, antennae, actuator wing, and integral sensor of the micro air vehicle made according to the present invention comprise micropower rods.

Another configuration of the present invention relates to smart needles. In such embodiments, a tube having three dimensions (length, width, and depth) that is circular, square, oblong, or rectangular in cross section is extended in at least one dimension to incorporate sensor, communications and energy harvesting electronics technology within the tube. In a preferred embodiment, the thickness of the tube in 2 of the 3 dimensions is less than 1 mm, and the axial ratio is >1. The term "axial ratio" as used herein refers to ratio of the length of the tube to the diameter of the tube:

Axial ratio ($P$)=length/diameter

Figure 4:
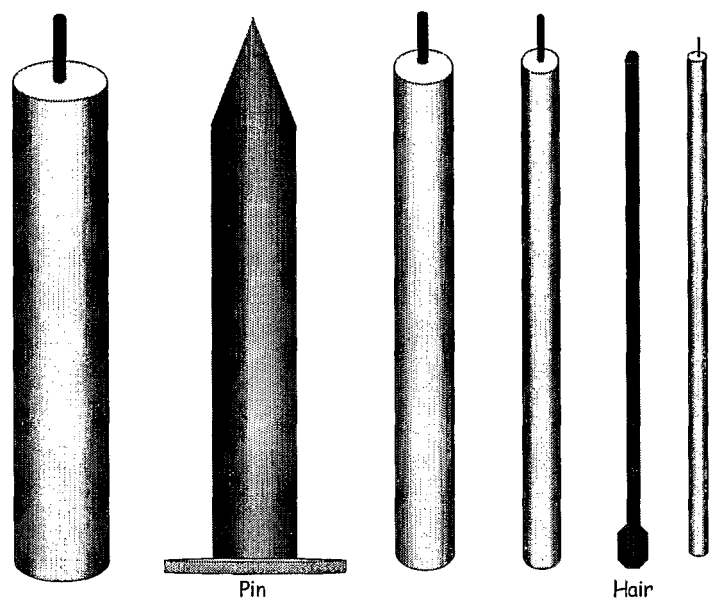
FIG. 4 illustrates the scalability of the micropower rod configuration fabricated according to the present invention.

This smart needle configuration has the advantages of ease of deployment and lower cross sectional profile. For pharmaceutical or biomedical applications, a needle sensor made according to the present invention can be injected into the body of a patient to provide in-vivo sensor and localized drug delivery. FIG. 4 shows the scalability of the smart needle configuration: power rods of the present invention can be formed from diameters larger than a pin (100s micron), and from diameters between that of a pin and a hair (10s micron). Present day state of the art stainless tube construction allows a range from a small 450/338 μm outer diameter/inner diameter ("OD/ID") down to a very fine 125/50 μm OD/ID for stainless having a 25 μm tungsten inner core electrode. Newly adopted micromachining techniques in silicon and stainless allow an OD of about 30-50 μm with a 5-10 μm inner core current collector, the limit of practicality for this configuration. In addition, complete current collector structures comprising an inner current collector and an outer current collector made according to the present invention can be micro machined from a metal monolithe. As envisioned, the MPRs could extend to long continuous dimensions or be interconnected, both allowing large increases in stored energy.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed.

Example 1

Formation of Electrochemical Cells In Situ from a Nanocomposite of LiI and Poly(vinylpyrrolidone) (PVP)

LiI and poly(vinylpyrrolidone) (PVP) were dissolved in methanol and dried in a glass Petri dish at 150° C. under air. Afterwards, the material was ground and dried under vacuum. The resulting material was reground and placed inside of an electrochemical test cell of Swagelok construction. The cell was compressed such that the powder formed a densified disk of approximately 200 micron thickness. The cell was placed on a computer-controlled galvanostat and the cell was charged at a constant current of 10 μA.

Figure 5:
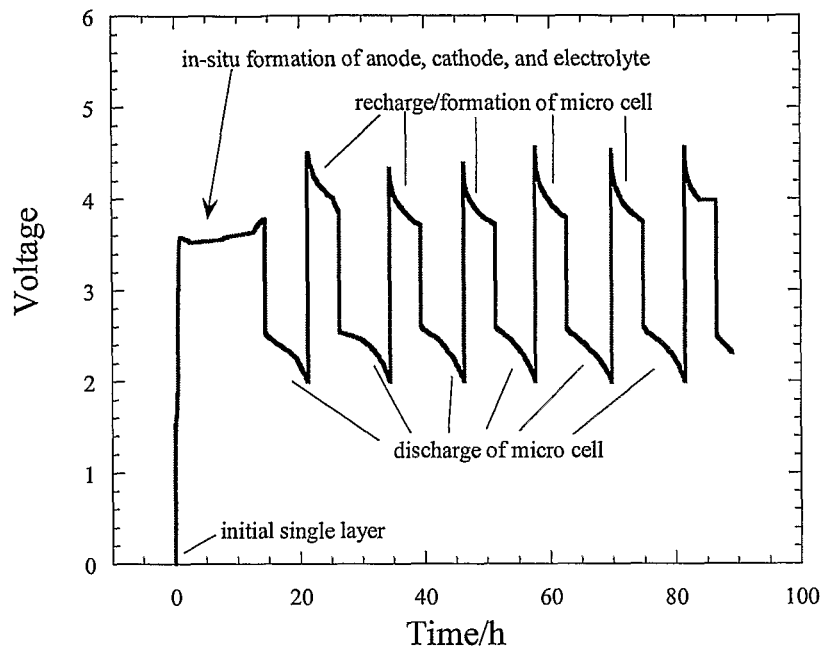
FIG. 5 is a graph depicting the in situ formation of an electrochemical cell from a composite formed from LiI and poly(vinylpyrrolidone) reagents.

As shown in the charge-discharge curve in FIG. 5, the initial voltage of the cell was zero volts, consistent with the fact that only the LiI based composite but no electrochemical cell existed. During the charge, a long plateau develops at approximately 3.5V. At this point, a 3-layer cell is formed in situ. During charge, lithium metal is deposited at the negative current collector to form the anode and an iodine-PVP composite is formed by the oxidation of I$^-$ to an iodine species containing polyiodide. Intermediate in the charging process, the cell is placed on discharge to confirm the existence of the electrochemical couple. Surprisingly, a discharge plateau is developed during discharge between 2-2.5 V. This confirms the in-situ formation of a useable electrochemical cell and deliverance of useful electrochemical energy.

Example 2

Figure 6:
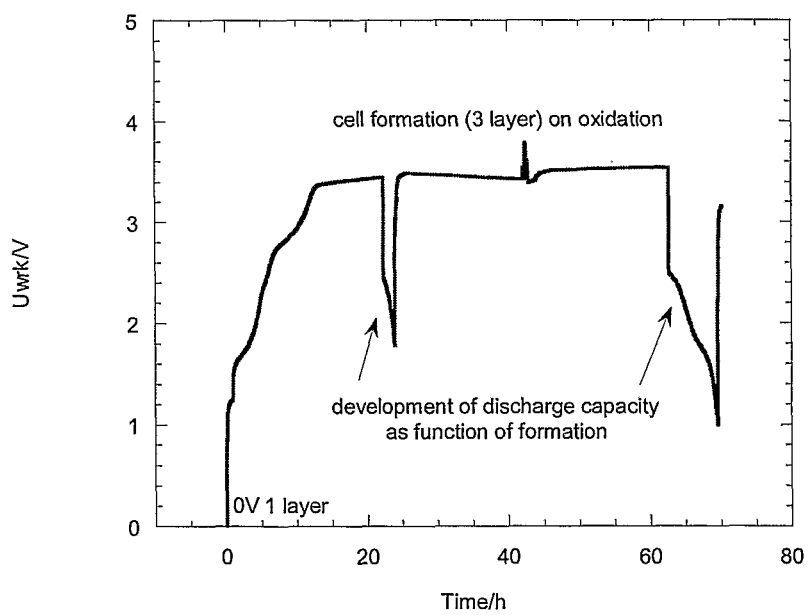
FIG. 6 is a graph depicting the in situ formation of an electrochemical cell from a composite of LiI and polyethylene oxide reagents.

Formation of Electrochemical Cells In Situ from a Nanocomposite of LiI and Polyethylene Oxide LiI and polyethylene oxide (PEO) were dissolved and cast in a solvent of acetonitrile. The fabricated free-standing film was cut out and placed in an electrochemical cell and tested electrochemically as described in Example 1. Here, a temperature of 80° C. was utilized to improve kinetics. As shown in the charge-discharge curve in FIG. 6, the cell showed no initial voltage. However, after application of current, a three layer cell was formed in-situ. The capacity of the cell could be recovered on subsequent discharges. The length of the discharge corresponds directly with the length of the formation of the charge.

Example 3

Fabrication and Electrochemistry of LiI/10% PVP Nanocomposites

Table 1 summarizes the fabrication conditions and resulting electrochemical data of a number of examples of the present invention fabricated by mixing the indicated molecular percentage of organic compound, such as polyvinylpyrolidone (PVP), with acetone and a lithium iodide. For each example, the solution was dried under indicated conditions and time. Afterwards the powder was transferred into a He filled glovebox of −80° C. dewpoint. The material was then characterized by Fast Fourier Transformed Infrared Spectroscopy ("FTIR") and X-Ray Diffraction ("XRD") for structural characteristics.

Approximately 50 mg of the remaining material was placed into an electrochemical cell and pressed at 7000 psi. Afterwards the cell was placed in an oven at 110° C. to remelt the powder. The cell then was removed, cooled and pressed at 5000 psi. The pellet that typically formed in the cell was a 1 cm$^2$, 100 micron thick nanocomposite containing lithium and iodide. Afterwards, the ionic conductivity (mS/cm) was measured by AC impedance spectroscopy. The term "ionic conductivity" as used herein refers to the ability of a material to pass an electric current through the motion of electrically charged ions, in this case being Li$^+$. Finally the cell was placed at room temperature (24° C.), charged in-situ to form the electrochemical cell, and then cycled under the indicated protocol. The last column in Table I represents the discharge times recorded as a function of cycle at a rate of 0.005 mA/cm$^2$.

drying (air=ambient air, vac=vacuum); and the last "number-h" refers to drying time in hours (typically 3 or 6 hours).

At ambient temperature, the ionic conductivities of the various LiI/PVP examples ranged from about 1×10$^{-1}$ mS/cm to about 9×10$^{-4}$ mS/cm; typically partially hydrated samples showed the best ionic conductivity under the conditions tested.

Figures 8, 9:
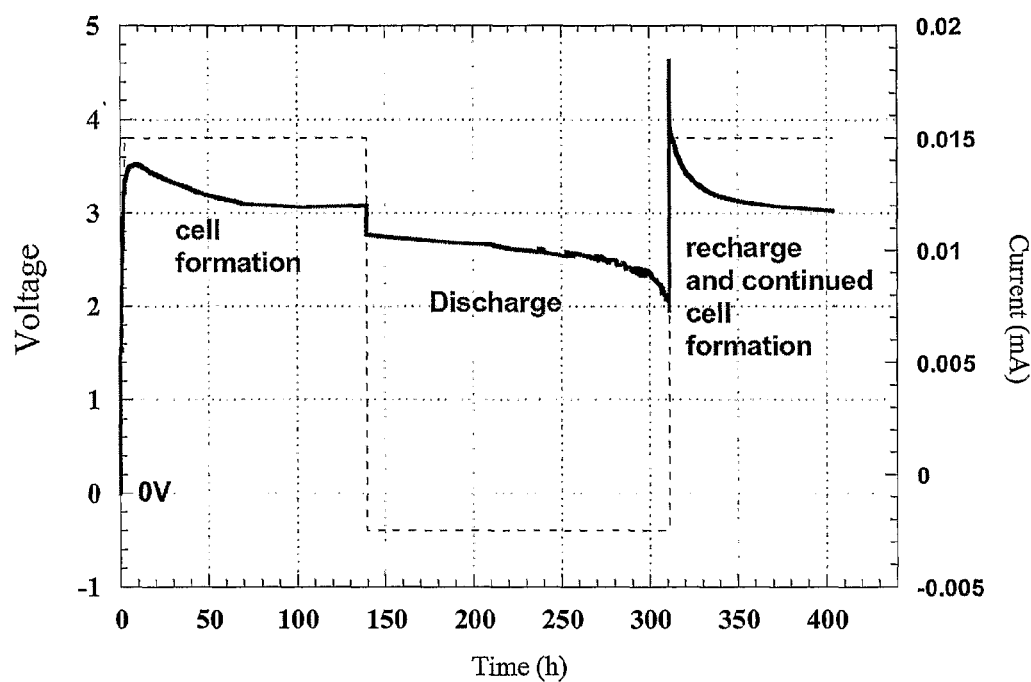
FIG. 8 is a graph depicting the formation, first discharge curve and energy density calculations for Example 5 from Table 1.
FIG. 9 is a graph depicting the reformation, second discharge curve, and energy density calculations for Example 5 from Table I.

The charge-discharge curve in FIG. 8 shows the formation, first discharge curve and energy density calculations for Example 5 from Table 1. The cell was initially partially charged to a current of 0.015 mA. The initial voltage of the cell was zero volts, consistent with the fact that only the LiI composite but no electrochemical cell existed. During the charge, a long plateau develops at approximately 3.2V. At this point, a 3-layer cell is formed in situ, resulting in a current of about 0.012 mA. At about 170 h, the cell was placed on discharge. During discharge, a discharge plateau between about 2.4-2.8 V developed. The total discharge capacity of the cell was about 0.425 mAh. As used herein, the terms "discharge capacity" and "specific capacity" are used interchangeably to refer to the amount of energy the LiI nanocomposite contains in milliamp hours (mAh) per unit weight. Based on a voltage of 2.6V, the total discharge energy was 1.105 mWh or 3.99 J. Upon recharge, the cell developed a long plateau at about 3.2 V, resulting in a current of about 0.012 mA, confirming the electrochemical stability and reversibility of the cell comprising the LiI/10% PVP nanocomposite fabricated according to example 5. Based on a thickness of 0.1 mm and an area of 78 mm$^2$, the energy density of the cell was calculated as about 0.51 J/mm$^3$.

The charge-discharge curve in FIG. 9 shows the reformation, second discharge curve and energy density calculations for example 5 from table 1. It demonstrates that the capacity of the cell comprising the LiI/10% PVP nanocomposite fab-

TABLE I

Conditions and parameters for composite materials fabricated under a variety of conditions

| Sample number | % PVP | Anneal Temp, °C. | Anneal time, h | Anneal Atm | Acetone (g) | Charge (c), Discharge (d), current/cycle (uA) | Discharge time/cycle | Conductivity (ms/cm) |
|---|---|---|---|---|---|---|---|---|
| 1 | 10 | 130 | 3 | air-ambient | 5 | c20, d5 | 54, 39, 18 | 2.40E−03 |
| 2 | 10 | 130 | 3 | air-ambient | 5 | c40, d5 | 53, 37, 18, 14, 12 | 2.80E−03 |
| 3 | 10 | 130 | 3 | air-ambient | 5 | c40, d5 | 62, 47, 55, 21, 15, 4 | 2.50E−03 |
| 4 | 10 | 130 | 6 | air-ambient | 5 | c40, d5 | 26, 19 | 8.40E−04 |
| 5 | 10 | 130 |   | air-ambient | 5 | c20, d5 | 171, 184, 79 | 2,60E−03 |
| 6 | 10 | 130 |   | vac | 5 | c2.5, d2.5 | 23 | 1.60E−05 |
| 7 | 10 | 130 |   | air-ambient | 5 | c2.5, d2,5 | 20, 40 | 1.08E−04 |
| 8 | 10 | 130 | 6 | air-ambient | 5 | c20, d5 | 26, 5, 5, 2 | 1.60E−03 |
| 9 | 10 | 120 | 3 | air-ambient | 5 | c5, d5 | 23, 11 | 9.70E−05 |
| 10 | 10 | 120 | 6 | air-ambient | 5 | c5, d5 | 26, 19 | 8.40E−04 |
| 11 | 10 | 140 | 3 | air-ambient | 5 | c20, d5 | 40, 63, 73, 57 | 5.32E−04 |
| 12 | 10 | 140 | 6 | air-ambient | 5 | c20, d5 | 54, 23, 17, 12 | 7.80E−04 |
| 13 | 10 | 130 | 1 | air-ambient | 5 | c30, d5 | 5, 17, 22s | 4.90E−05 |
| 14 | 10 | 130 | 1 | air-ambient | 5 | c30, d5 | 9,5, 13, 15s | 1.20E−04 |
| 15 | 10 | 130 | 3 | air-ambient | 5 | c30, d5 | 13, 8, 10s | 9.40E−05 |
| 16 | 10 | 130 | 3 | air-ambient | 5 | c30, d5 | 9, 13, 15s | 9.40E−05 |
| 17 | 10 | 130 | 3 | air-ambient | 5 | c30, d5 | 26, 37 | 2.00E−04 |
| 18 | 10 | 130 | 3 | air-ambient | 5 | c30, d5 | 25, 33 | 9.40E−04 |
| 19 | 10 | 130 | 3 | air-ambient | 5 | c30, d5 | 27 | 6.50E−05 |
| 20 | 10 | 130 | 3 | air-ambient | 7 | c30, d5 | 46 | 320E−04 |
| 21 | 10 | 130 | 3 | air-ambient | 4 | c30, d5 | 15 | 1.00E−04 |
| 22 | 10 | 130 | 3 | air-dry room | 4 | c30, d5 | 50 | 5.30E−04 |
| 23 | 5 | 130 | 3 | air-dry room | 5 | c30, d5 | 17, 29, 39 | 1.60E−05 |
| 24 | 15 | 130 | 3 | air-dry room | 5 | c30, d5 | 2, 2, 1, 4 | 4.50E−03 |
| 25 | 20 | 130 | 3 | air-dry room | 5 | c30, d5 | 3, 7, 5, 5.5 | 2.80E−05 |
| 26 | 10 | 130 | 3 | air-ambient | 5 | c30, d5 | 24, 36, 39 | 7.60E−05 |
| 27 | 10 | 130 | 3 | air-ambient | 4 | c30, d5 | 12, 24 | 6.60E−05 |
| 28 | 10 | 140 | 6 | air-ambient | 4 | c30, d5 | 40 (2.6v) | 1.50E−03 |

Figure 7:
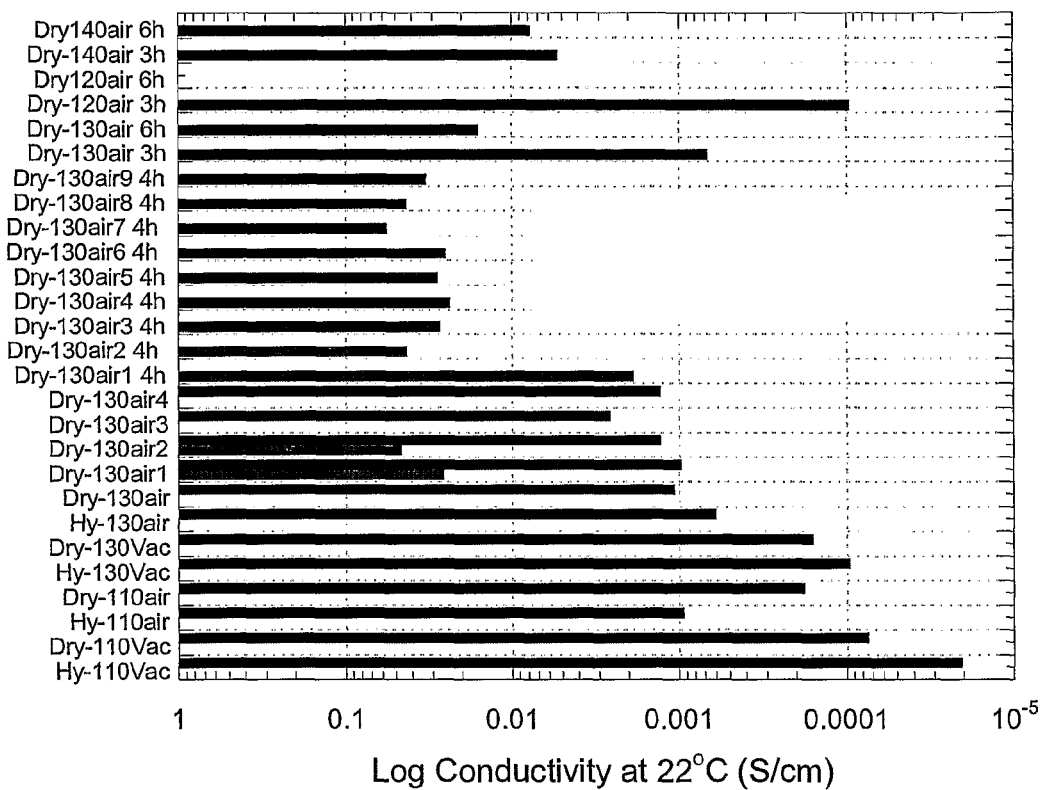
FIG. 7 is a bar graph showing the ionic conductivity of various samples formed from a composite of LiI and poly(vinylpyrrolidone) reagents.

FIG. 7 is a bar graph summarizing the ionic conductivity of a number of the examples prepared as described in Example 3 as a function of synthesis. The synthesis conditions are described on the Y axis. The term "dry" as used herein indicates that LiI stored under anhydrous conditions in a glovebox was utilized as a precursor. The triple digit number refers to drying temperature (typically 120° C., 130° C., or 140° C.); the description "air" or "vac" describes atmosphere during ricated according to example 5 is reversible. The term "reversible discharge capacity" means that the LiI nanocomposite of the present invention may be recharged by passing a current through it in a direction opposite to that of discharge. The cell was discharged at 184 h. The total discharge capacity of the cell was 0.460 mAh. Based on a voltage of 2.6V, the total discharge energy was 1.196 mWh or 4.31 J. Upon recharge, the cell developed a long plateau at about 3V, resulting in a current of about 0.012 mA, confirming the electrochemical stability and reversibility of the cell comprising the LiI/10% PVP nanocomposite fabricated according to example 5. Based on a thickness of 0.1 mm and an area of 78 mm$^2$, the energy density of the cell after reformation and a second discharge was calculated as about 0.55 J/MM$^3$. Therefore cell reformation followed the second discharge cycle and recharge.

Figure 10:
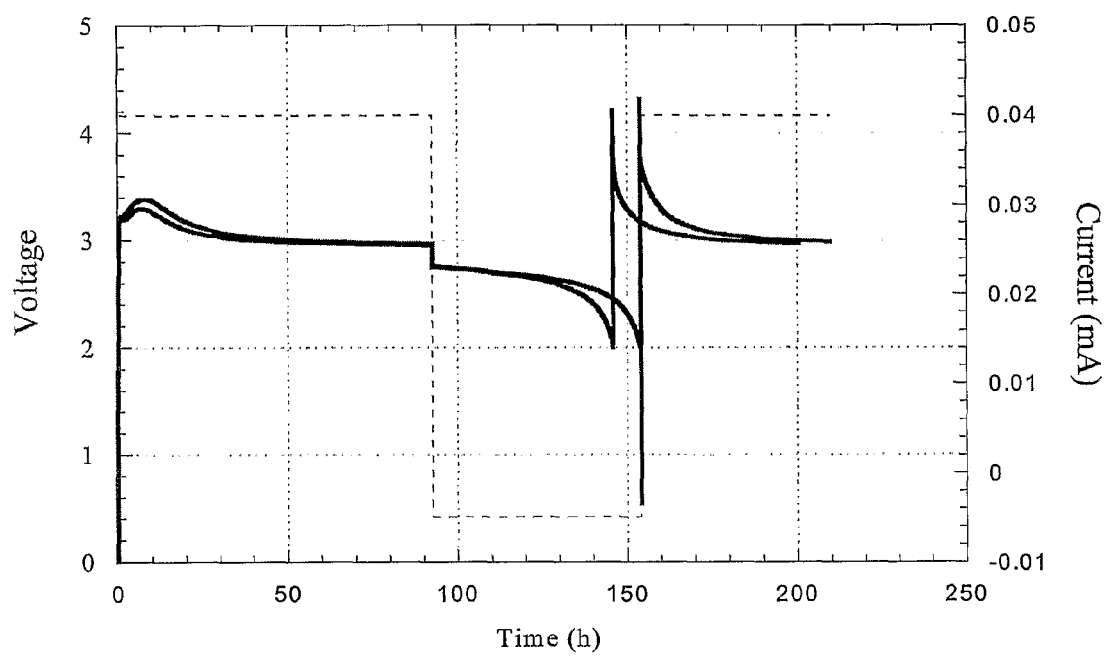
FIG. 10 is a graph depicting the formation, first discharge curve, and energy density calculations for two cells fabricated from the composition of Example 11 from Table I.

The charge-discharge curve in FIG. 10 shows the formation, first discharge curve and energy density calculations for 2 cells fabricated from composition of example 11 from table 1.

The cell was initially partially charged to a current of about 0.02 mA. The initial voltage of the cell was zero volts, consistent with the fact that only the LiI composite but no electrochemical cell existed. During the charge, a long plateau develops at approximately 3.4V, corresponding to formation of a 3-layer cell in situ and a current of about 0.026 mA. At about 63 h, the cells were discharged; cells disassembled at this point clearly show metallic lithium on the negative electrode, indicating successful in-situ cell formation. A discharge plateau between about 2.4-2.6 V developed during discharge. The total discharge capacity of the cells was about 0.315 mAh. Based on a voltage of 2.6V, the total discharge energy was 0.819 mWh or 2.95 J. Upon recharge, the cells developed a long plateau at about 3.2 V, resulting in a current of about 0.026 mA, confirming the electrochemical stability and reversibility of the cell comprising the LiI/10% PVP nanocomposite fabricated according to example 11. Based on a thickness of 0.1 mm and an area of 78 mm$^2$, the energy density of the cells was calculated as about 0.38 J/mm$^3$.

Figure 11:
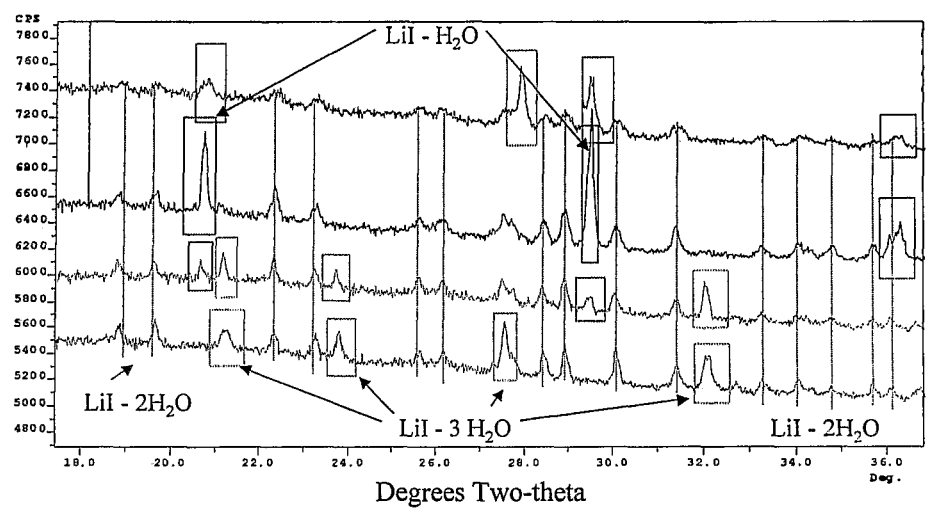
FIG. 11 shows X-ray diffraction data of LiI nanocomposites fabricated in the presence of different amounts of acetone.

X-ray diffraction patterns of LiI nanocomposites of the present invention fabricated in the presence of different amounts of acetone show the formation of various useful composite phases comprising lithium and iodide, depending on the amount of acetone utilized in synthesis of the LiI nanocomposites. Since the X-rays are reflected by the atoms in each sample's lattice, and since the wavelength is of the same order of magnitude as interatomic distances in the solid state, the interference among the reflected X-rays leads to a unique diffraction pattern for each specific material. As shown in FIG. 11, the XRD pattern of a LiI nanocomposite synthesized in the presence of 4 g acetone has four XRD peaks at about 21, 24, 27.5 and 32 deg 2θ. The reflections at about 21, 24 and 32 deg 2θ correspond to the trihydrate, LiI.3H$_2$O. The XRD pattern of a LiI nanocomposite synthesized in the presence of 5.5 g acetone has the three trihydrate peaks, the 21, 24 and 32 deg 2θ peaks, and a peak at about 20.5 and at about 29.5 deg 2θ. The 20.5 and 29.5 peaks correspond to the monohydrate LiI.H$_2$O. The XRD pattern of a LiI nanocomposite synthesized in the presence of 7 g acetone displayed prominent peaks at 20.5 and at 29.5 deg 2θ, corresponding to the monohydrate, and an additional peak at (036). The XRD pattern of a LiI nanocomposite synthesized in the presence of 10 g acetone displayed peaks at about 21, 27.5, 29.5, and at 36 deg 2θ, most of which is attributed to the monohydrate version of LiI. The remaining peaks identified by a dotted line are believed to be attributed to the dihydrate of LiI. Therefore degree of hydration of the LiI based nanocomposite and accordingly the resulting electrochemical properties can be controlled by the acetone content of the original mixture.

Figure 12:
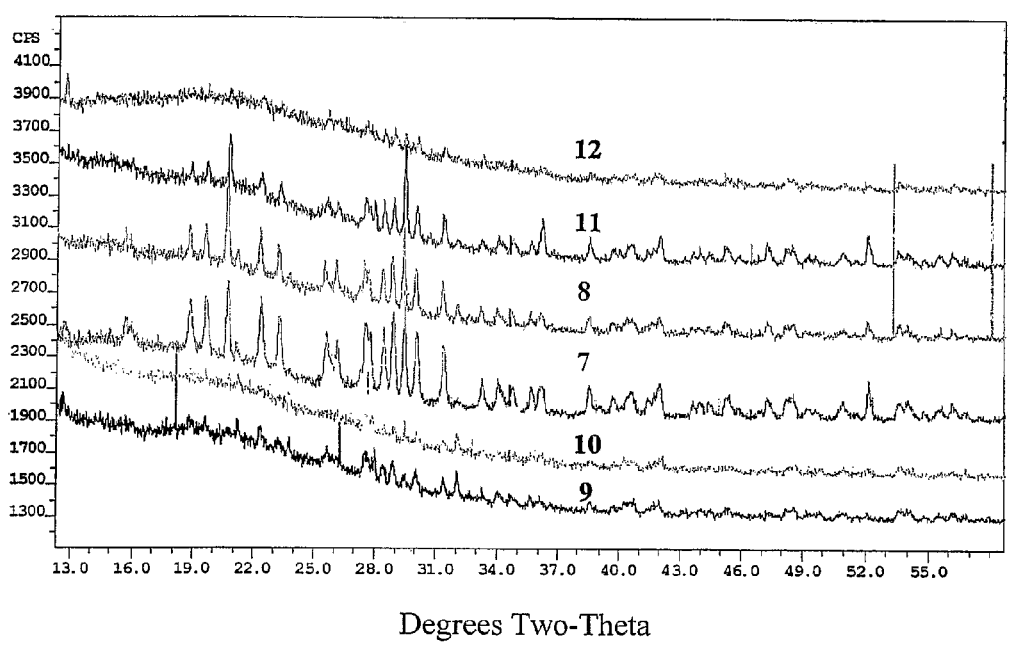
FIG. 12 shows X-ray diffraction patterns of various useful composites and nanocomposites prepared in accordance with examples 7-12 in table I.

FIG. 12 shows XRD patterns of a composite and nanocomposite prepared in accordance with Table I for examples 7-12. While 5 g acetone was used in the synthesis of each of these examples, they were subjected to different post-fabrication combinations of anneal time and temperature. With reference to the phases identified in FIG. 11, FIG. 12 shows that the thermal treatment induces significant changes in the degree of hydration of the LiI based nanocomposite.

Figure 13:
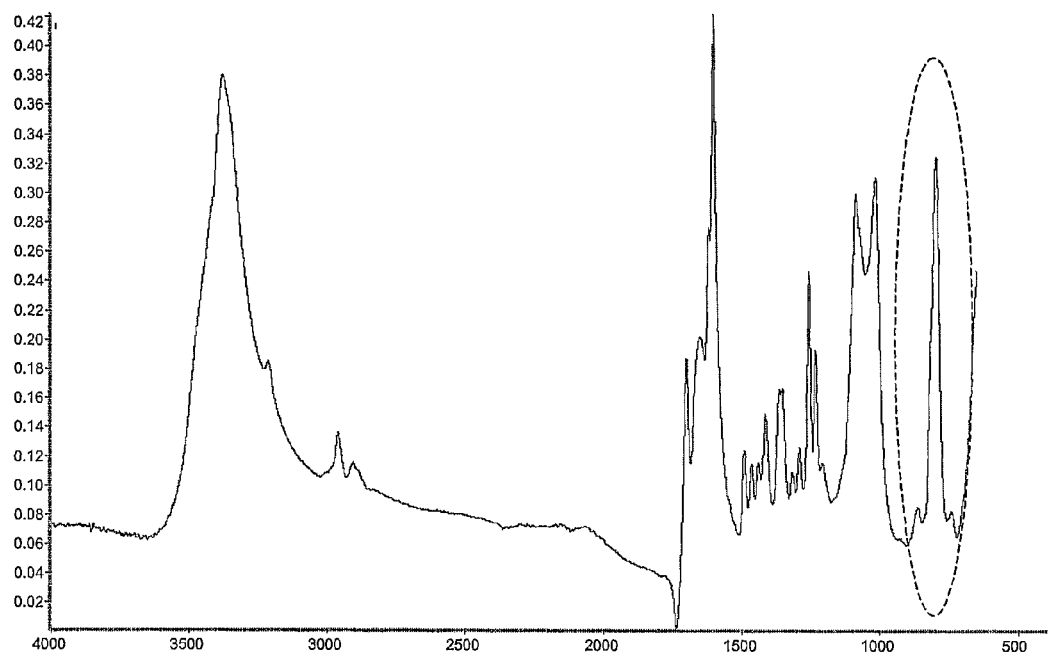
FIG. 13 shows an FTIR spectrum of a composition from Table I example 3 that was removed from the cell after cycling for six cycles.

FIG. 13 shows an FTIR spectrum of a composition of the present invention from Table I Example 3. The sample was removed from the cell after cycling for 6 cycles. A broad band observed at 800 cmi$^{-1}$ in the FTIR spectrum (circled) indicates the presence of iodate (IO$_3$)$^-$ compounds, which are formed in-situ during the oxidation/formation process in addition to polyiodides as discussed below.

Figure 14:
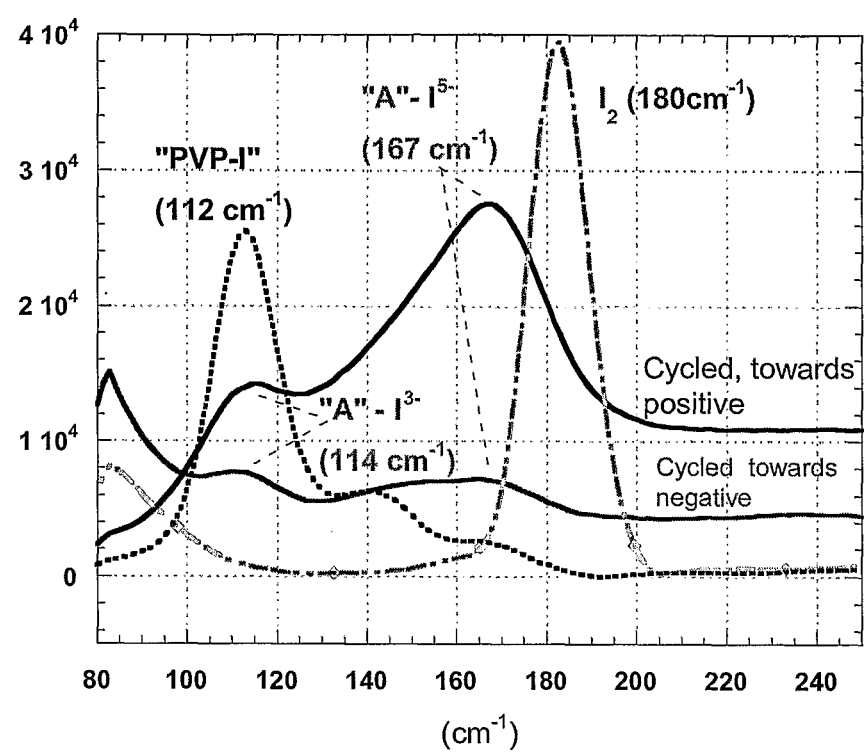
FIG. 14 shows a Raman spectrum of the positive electrode of a composition from Table I that was removed from the cell after cycling for a number of cycles.

FIG. 14 shows a Raman spectra made of a 100 micron pellet which was fabricated and cycled as described above. After cycling the cell was opened and the formed battery was analyzed by local Raman spectroscopy in two areas, one next to the positive current collector, the second further away from the positive current collector towards the negative current collector. Both spectra consisted of polyiodides, the latter a tri-iodide, the former a penta-iodide. The location of each is consistent with its respective oxidation of the iodide anion. The standard spectra of polyvinylpyrolidone iodine (PVP-I) and that of iodine (I$_2$) shows that the cell formed in situ contains a positive electrode that is neither PVP-I nor I$_2$ and is unique. More importantly, it confirms the presence of an oxidized iodine species.

Example 4

Addition of Nanostructured Inorganic Materials to the Lithium Iodide Composite

Figure 15:
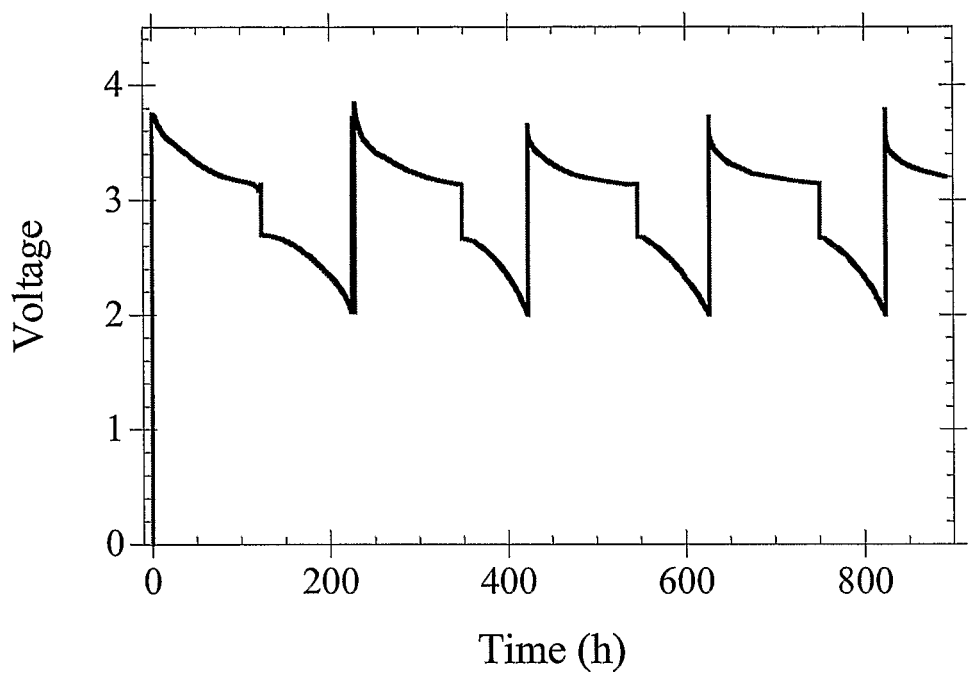
FIG. 15 shows the voltage profile of a lithium iodide-PVP based composite fabricated with the addition of 5 wt % 20 nm particle size fumed silicon oxide.

The addition of nanostructured inorganic materials to the lithium iodide composite was studied to improve initial ionic conduction of the composite. A lithium iodide—PVP based composite was fabricated as detailed in Example 3 with the addition of 5 wt % of 20 nm particle size fumed silicon oxide. The composite was heat treated in a teflon container at 130° C. The sample was removed, ground to a powder, pressed to a 100 micron thick pellet and reannealed at 150° C. for 0.5 h. Resulting discharge at 0.005 mA/cm$^2$ revealed discharge times of 98 h and 78 h at a voltage of 2.5V for cycles 1 and 3 respectively. The representative voltage profile is shown in FIG. 15.

The examples of the present invention as described are embodiments of a self assembled cell based on lithium and iodine and do not limit the scope of the present invention. These examples demonstrate the principle of an electrochemically self assembled solid state battery that is enabled through the use of an ion conductor composite or nanocomposite that conducts the metal cation and/or a halide anion. Any such self assembled cell can be developed from what has been described herein as long as these conditions are met and if the anion can be complexed or form a solid oxidized product at the positive electrode. A skilled artisan would appreciate that other embodiments of the present invention include, but are not limited to, embodiments based on magnesium and iodine, lithium and bromine, calcium and fluorine, magnesium and bromine, and the like.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural references unless the context clearly dictates otherwise. All technical and scientific terms used herein have the same meaning. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges which may independently be included in the smaller ranges is also encompassed within the invention, subject to any specifically excluded limit in the stated range. Where the stated range includes one or both of the limits, ranges excluding either both of those included limits are also included in the invention.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

The invention has been described with reference to the preferred embodiment to illustrate the principles of the invention and not to limit the invention to the particular embodiment illustrated. Modifications and alterations may occur to others upon reading and understanding the preceding detailed description. It is intended that the scope of the invention be construed as including all modifications and alterations that may occur to others upon reading and understanding the preceding detailed description insofar as they come within the scope of the following claims or equivalents thereof.

What is claimed is:

1. A method for forming an electrochemical cell in situ from a nanocomposite which enables self-assembly of a tri-layer electrochemical cell, comprising the steps of:
   supplying an ionically conductive, electrically insulative single-layer nanocomposite between two current collectors at an initial voltage of 0 V, wherein the nanocomposite has an ionic conductivity greater than 0.0001 mS/cm and includes a binder and a metal halide having a metal cation and a halide anion; and
   applying a potential across the nanocomposite by way of the two current collectors, thereby forming in situ the tri-layer electrochemical cell comprising:
   (i) a negative electrode comprising an elemental metal formed by reducing the metal cation;
   (ii) a positive electrode comprising an oxidized form of the halide anion; and
   (iii) a thermodynamically stable electrolyte comprising the metal halide.

2. The method according to claim 1, wherein the metal halide nanocomposite is selected from the group consisting of an alkali metal halide nanocomposite, an alkaline earth metal halide nanocomposite, and a rare earth metal halide nanocomposite.

3. The method according to claim 2, wherein the alkali metal halide nanocomposite comprises an alkali metal cation selected from the group consisting of a lithium cation, a sodium cation, a potassium cation, a rubidium cation, and a cesium cation.

4. The method according to claim 3, wherein the alkali metal halide nanocomposite is a lithium iodide nanocomposite comprising a lithium cation and an iodide anion.

5. The method according to claim 2, wherein the alkaline earth metal halide nanocomposite comprises an alkaline earth metal cation selected from the group consisting of a magnesium cation, a calcium cation, a strontium cation, and a barium cation.

6. The method according to claim 2, wherein the rare earth metal halide nanocomposite comprises a rare earth metal cation selected from the group consisting of a yttrium cation and a lanthanum cation.

7. The method according to claim 1, wherein the metal halide nanocomposite comprises a halide anion selected from the group consisting of a fluoride anion, a bromide anion, an iodide anion and a chloride anion.

8. The method according to claim 1, wherein the metal halide nanocomposite comprises a fluoride anion.

9. The method according to claim 1, wherein the metal halide nanocomposite comprises an iodide anion.

10. The method according to claim 9, wherein the forming in situ further comprises forming a compound comprising an oxidized iodate ion at the positive electrode upon application of the potential.

11. The method according to claim 9, wherein the forming in situ further comprises forming an oxidized compound comprising a polyiodide ion at the positive electrode upon application of the potential.

12. The method according to claim 9, wherein the forming in situ further comprises forming an oxidized compound comprising a metal iodide at the positive electrode upon application of the potential.

13. The method according to claim 1, wherein the metal halide nanocomposite further comprises an organic component.

14. The method according to claim 13, wherein the organic component is an organic material that forms compounds with iodine.

15. The method according to claim 13, wherein the organic component is poly(vinylpyrrolidone).

16. The method according to claim 13, wherein the organic component is a conductive compound.

17. The method according to claim 13, wherein the organic component is a conductive compound selected from the group consisting of vinylpyridine, poly(2 vinylpyridine), ethylene oxide, polyethylene oxide, vinylidene fluoride, polyvinyldene fluoride, thiophene, polythiophene, fluorothiophene, polyfluorothiophene, pyrrole, polypyrrole, aniline, and polyaniline.

18. The method according to claim 1, wherein the metal halide nanocomposite further comprises a nanostructured inorganic component.

19. The method according to claim 18, wherein the nanostructured inorganic component is at least one compound selected from the group consisting of silicon oxide, aluminum oxide, barium titanate, and silicon nitride.

20. The method according to claim 1, wherein the metal halide nanocomposite further comprises at least one subgroup selected from the group consisting of water and hydroxyl ions.

21. The method according to claim 1, wherein the negative electrode further comprises a metal current collector.

22. The method according to claim 21, wherein the metal current collector of the negative electrode is formed of a metal selected from the group consisting of stainless steel, silicon, nickel, aluminum, tin, gold, silver, platinum, and copper.

23. The method according to claim 21, wherein the oxidized halide ion forms a complex with the metal current collector of the positive electrode.

24. The method according to claim 1, wherein the positive electrode comprises a metal current collector.

25. The method according to claim 24, wherein the metal current collector of the positive electrode is formed of a metal selected from the group consisting of stainless steel, copper, nickel, aluminum, gold, silver, and platinum.

26. The method according to claim 1, wherein the metal halide nanocomposite is deposited in a thickness of less than 100 microns.

27. The method according to claim 1, wherein the metal halide nanocomposite is deposited by a direct write technology.

* * * * *